(12) United States Patent
Nakagawa

(10) Patent No.: US 7,215,467 B2
(45) Date of Patent: May 8, 2007

(54) SYSTEM AND METHOD FOR CONTROLLING MICROSCOPE

(75) Inventor: Shuji Nakagawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/464,583

(22) Filed: Jun. 17, 2003

(65) Prior Publication Data
US 2003/0227673 A1 Dec. 11, 2003

Related U.S. Application Data

(63) Continuation of application No. PCT/JP02/01797, filed on Feb. 27, 2002.

(30) Foreign Application Priority Data
Mar. 1, 2001 (JP) .............................. 2001-056095

(51) Int. Cl.
G02B 21/00 (2006.01)
(52) U.S. Cl. .................... 359/380; 250/201.4
(58) Field of Classification Search ................ 359/368, 359/363, 379–381, 821; 250/201.3, 201.4; 382/255
See application file for complete search history.

(56) References Cited

U.S. PATENT DOCUMENTS 4,661,692 A * 4/1987 Kawasaki ................ 250/201.2
5,592,563 A * 1/1997 Zahavi ........................ 382/154
5,621,500 A * 4/1997 Shiraishi ....................... 355/71
5,886,813 A * 3/1999 Nagasawa ................... 359/383
5,926,450 A * 7/1999 Braat ......................... 369/53.2
5,932,872 A * 8/1999 Price ........................ 250/201.3
5,942,357 A * 8/1999 Ota .............................. 430/22
6,229,928 B1 5/2001 Matsuzawa

FOREIGN PATENT DOCUMENTS

| JP | 55-140805 A | 11/1980 |
| JP | 6-250097 A | 9/1994 |
| JP | 11-96334 A | 4/1999 |

* cited by examiner

Primary Examiner—Mark A. Robinson
Assistant Examiner—Lee Fineman
(74) Attorney, Agent, or Firm—Frishauf, Holtz, Goodman & Chick, PC

(57) ABSTRACT

A CPU determines an optical-axis direction moving interval of a focal point of a microscope based on a wavelength of light used for sample observation by the microscope and a numerical aperture of an object lens mounted on the microscope, and controls the microscope so as to sequentially move a position of the focal point of the microscope with respect to a sample position in the optical-axis direction at determined moving intervals. Every time the control moves the position, with respect to the sample position, of the focal point at the moving interval, the microscope is so controlled as to sequentially obtain a microscopic image produced when the position of the focal point is at a position after the moving.

12 Claims, 11 Drawing Sheets

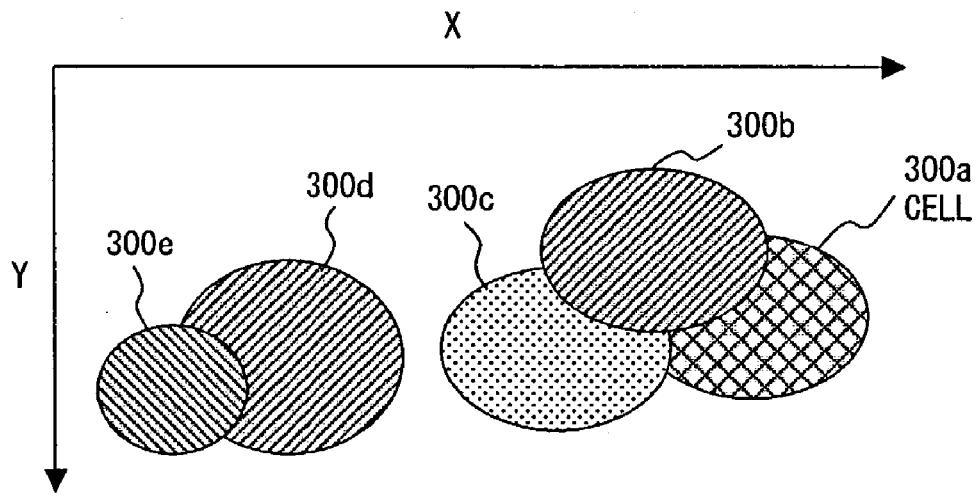
F I G. 3 A
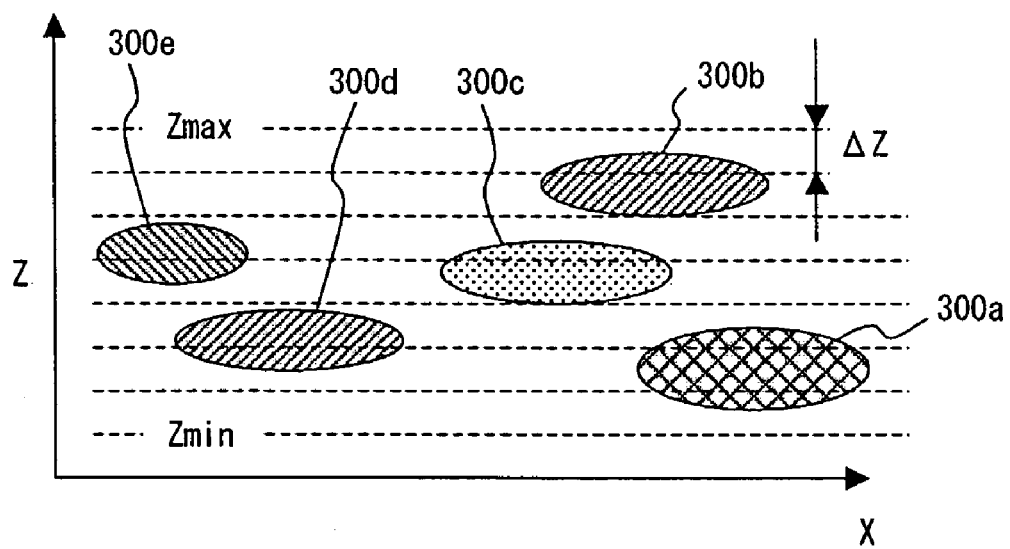
F I G. 3 B

| NAME OF OBJECT LENS | NA |
|---|---|
| PlanApo1.25x | 0.04 |
| PlanApo2x | 0.08 |
| PlanApo4x | 0.16 |
| PlanApo10x | 0.40 |
| ⋮ | ⋮ |
| ⋮ | ⋮ |

F I G. 4

SYSTEM AND METHOD FOR CONTROLLING MICROSCOPE

CROSS REFERENCE TO RELATED APPLICATIONS

This is a Continuation Application of PCT Application No. PCT/JP02/01797, filed Feb. 27, 2002, which was not published under PCT Article 21(2) in English.

This application is based upon and claims the benefit of priority from the prior Japanese Patent Application No. 2001-056095, filed Mar. 1, 2001, the entire contents of which are incorporated herein by reference.

BACKGROUND OF THE INVENTION

1. Field of the Invention

The present invention relates to the technology preferably applied to a system for observing a microscope image in the medical and biological fields, and more specifically to the technology applied to a telepathological system. The present invention can also be applied to, in addition to the telepathological system, an educational system using a microscope image observed by a computer for executing image browsing software by accumulating an image obtained by moving the microscope image in the optical axis direction, and distributing a virtual focus image through a communications network such as the Internet, etc.

2. Description of the Related Art

For example, in the medical field, the pathological diagnostics using a microscope is an indispensable diagnostic item. In this connection, a system for remote diagnostics by a pathologist resident at a university using a microscope image transmitted from a remote hospital to the university has been suggested.

Pathological diagnostics normally refers to a check of internal organs and organizations. The check targets are, for example, a stomach, a large intestine, a lymph node, etc. taken by a surgical method. Furthermore, a piece of organization taken in an endoscopic examination or using a thin pipe is also a check target which is referred to as a biological test specimen. Furthermore, liquid materials such as ascites, urine, phlegm, blood, etc. are also check targets. These liquid materials are targets of cell diagnostics because a check is made by collecting cells existing in the liquids.

In the cell diagnostics in the pathological diagnostics, since cells are applied to a slide for observation, the sample is thick. Therefore, the position of the focal point is not limited to only one. In this case, the microscope is used by shifting the focal point when a sample is observed. Relating to the above-mentioned technology, Japanese Patent Application Laid-open No. Hei 6-250097 discloses the microscope remote observation system in which a plurality of microscope images, which have the same coordinates and the same magnification as the macro image fetched by a video camera provided for the microscope at a specified position, obtained by changing the position of the focal point in the optical axis direction on the microscope are fetched into the computer, processed as a group of images obtained by shifting the focal point of a target, and regenerating the images. In this system, static images are transmitted to reduce the communications cost. Practically, it is easy to design a variation of the system such that moving pictures can be processed by using a communications line of a large capacity such as optical fiber, etc. and transferring the moving pictures obtained by moving an image in the optical axis direction of the microscope.

However, in the above-mentioned system, the moving pitch of a focal point (the amount of sequential moving in the optical axis direction of the microscope) for fetch of a microscope image in a plurality of positions of the focal points are not clearly defined and are optional. Therefore, wasteful images can be obtained depending on the moving pitch, or the image in a desired observation position cannot be obtained due to too long a moving pitch.

SUMMARY OF THE INVENTION

The present invention is based on the system, apparatus, and method for controlling a microscope for obtaining a microscope image of an observation target sample.

The microscope control system according to an aspect of the present invention obtains a microscope image of an observation target sample by controlling the microscope having at least two object lenses. The system includes: an object lens information record unit for recording object lens information associating the object lenses with the numerical aperture of the object lenses; an object lens selection information obtaining unit for obtaining selection information about the object lenses selected to obtain the microscope image; an object lens numerical aperture obtaining unit for obtaining the numerical aperture of the selected object lens from the object lens information record unit according to the selection information; a focal point moving interval determination unit for determining a moving interval per moving operation of optical-axis-direction moving of the position of the focal point of the microscope based on the numerical aperture of the object lens obtained by the object lens numerical aperture obtaining unit and the wavelength of light for observation of the sample; a focal point moving range determination unit for determining the range of motion when the optical-axis-direction moving of the position of the focal point is made on the sample based on the estimated value of the thickness of the sample; a focal point moving control unit for controlling the microscope such that the position of the focal point relative to the sample position can be sequentially moved in the optical axis direction depending on the moving interval and the range of motion; and a microscope image obtaining control unit for controlling the microscope such that the microscope image can be sequentially obtained each time and after the position of the focal point relative to the sample position is moved by the focal point moving control unit at the moving intervals.

The above-mentioned microscope control system according to the present invention can further include: a designation unit for designating an optional portion of the microscope image obtained by the control of the microscope image obtaining control unit; a brightness information obtaining unit for obtaining the information about the brightness of the portion; and a microscope image addition unit for adding a plurality of microscope images obtained by the microscope when the position of the focal point relative to the sample position is the same if the brightness is smaller than a predetermined value.

With the configuration, when the information about the brightness of each of the primary colors of light is obtained as the information about the brightness of the portion, the brightness information obtaining unit can be assumed to define the highest brightness value as the information about the brightness of the portion.

Furthermore, the above-mentioned microscope control system according to the present invention can further include a moving picture conversion unit for converting the microscope images which are a plurality of still images obtained in the different positions of the focal point at the moving intervals by the control of the microscope image obtaining control unit into one piece of moving picture data.

In the microscope control system according to the present invention, the focal point moving control unit can be configured to control the microscope such that the central point of the range of motion matches the position of the focal point about the sample obtained as a result of performing the autofocus setting capability of the microscope when the movement of the position of the focal point is controlled.

The focal point moving control unit can also be configured to control the microscope such that the upper limit of the range of the focal point on the sample obtained as a result of executing the autofocus setting capability of the microscope can match the upper limit of the range of motion, or the lower limit of the range of the focal point on the sample obtained as a result of executing the autofocus setting capability of the microscope can match the lower limit of the range of motion when the movement of the position of the focal point is controlled.

The microscope control system according to the present invention can also include: a requesting terminal having a microscope, and an observing terminal for designating the control of the microscope. The requesting terminal can include a requesting line connection unit for connecting the requesting terminal to the communications line, and transmitting image information representing the microscope image obtained by the microscope provided for the requesting terminal to the observing terminal. The observing terminal can include an observing line connection unit for connecting the observing terminal to the communications line, transmitting request information about a request to start designation of control of the microscope provided for the requesting terminal to the requesting terminal, and receiving the image information transmitted by the requesting line connection unit.

The above-mentioned microscope control system can also include a storage unit for storing image information representing the microscope images sequentially obtained by the control of the microscope image obtaining control unit.

The microscope control system according to the present invention can be configured to include a server terminal having the storage unit and a client terminal for obtaining the image information stored in the storage unit. The server terminal can include a server terminal line connection unit for connecting the server terminal to the communications line, and transmitting the image information stored in the storage unit to the client terminal. The client terminal can include a client terminal line connection unit for connecting the client terminal to the communications line, transmitting a request to transmit the image information stored in the storage unit of the server terminal to the server terminal, and receiving the image information transmitted by the server terminal line connection unit.

A microscope control apparatus according to another aspect of the present invention includes: a focal point moving interval determination unit for determining the optical-axis-direction moving interval of the focal point of the microscope based on the numerical aperture of the object lens used in the microscope for obtaining the microscope image and the wavelength of light used in observing the sample by the microscope; a focal point moving control unit for controlling the microscope such that the position of the focal point of the microscope can be sequentially moved in the optical axis direction relative to the sample position at a moving interval determined by the focal point moving interval determination unit; and a microscope image obtaining control unit for controlling the microscope such that the microscope image can be sequentially obtained each time and after the position of the focal point relative to the sample position is moved by the focal point moving control unit at the moving intervals.

A microscope control method according to a further aspect of the present invention can have the operation and effect similar to those of the above-mentioned microscope control system according to the present invention by: determining the optical-axis-direction moving interval of the focal point of the microscope based on the numerical aperture of the object lens used in the microscope for obtaining the microscope image and the wavelength of light used in observing the sample by the microscope; controlling the microscope such that the position of the focal point of the microscope can be sequentially moved in the optical axis direction relative to the sample position at the determined moving interval; and controlling the microscope such that the microscope image can be sequentially obtained each time and after the position of the focal point relative to the sample position is moved by the control at the moving intervals.

BRIEF DESCRIPTION OF THE DRAWINGS

The present invention will become more apparent by reference to the following detailed description of the invention taken in conjunction with the accompanying drawings.

FIG. 3A and FIG. 3B show an example is the state of the sample in the cell diagnostics;

FIG. 4 shows an example of the table showing the relationship between the name of the object lens and the numerical aperture;

DESCRIPTION OF THE PREFERRED EMBODIMENTS

The embodiments of the present invention are described below by referring to the attached drawings.

First Embodiment

Figure 1:
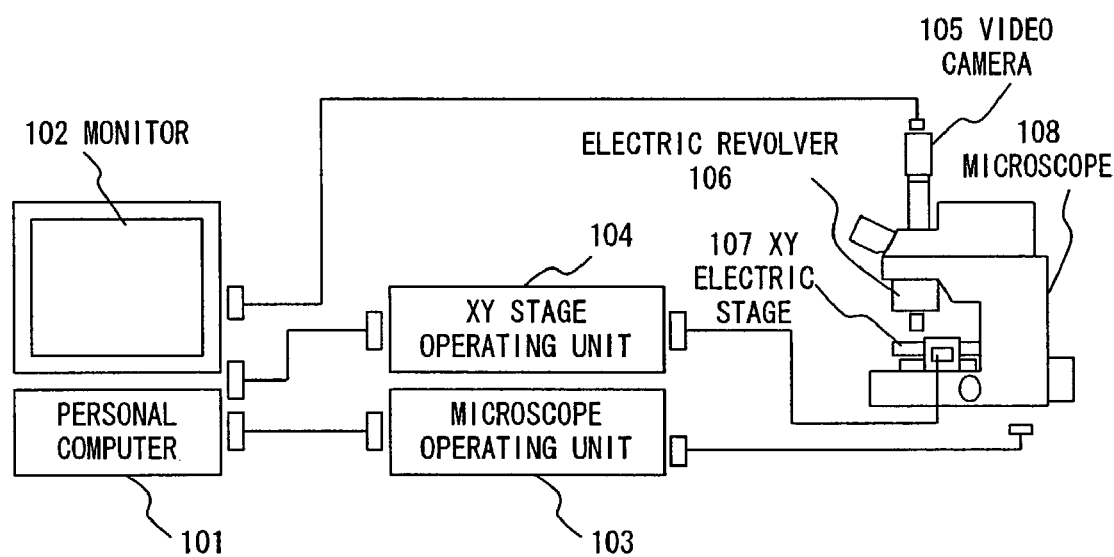
FIG. 1 shows the configuration of the entire microscope image observation system according to the first embodiment of the present invention.

FIG. 1 shows the configuration of the entire microscope image observation system according to the first embodiment of the present invention.

A microscope 108 comprises an electric revolver 106 for electrically switching the attached object lenses, a XY electric stage 107 capable of electrically moving a set sample in the direction (XY direction) perpendicular to the optical axis direction of the object lens, and a video camera 105. In FIG. 1, the microscope 108 comprises the video camera 105, and the video camera 105 converts a microscope image into a video signal (for example, a signal in accordance with the NTSC (National Television System Committee) system, the PAL (phase amplitude by line) system, etc.), but a high-precision digital camera can be used as the video camera 105 to generate image data which is the digital data representing the microscope image.

The microscope 108 further comprises an autofocus (AF) unit, a dimmer unit, an electric diaphragm unit, etc. not shown in FIG. 1 an electric unit for electrically controlling the microscope 108. The AF unit includes an electric Z control unit capable of moving the position of the focal point by moving the object lens (or a sample set on the XY electric stage 107) in the optical axis direction (Z direction) of the microscope 108. To prevent the object lens from contacting the XY electric stage 107 on the microscope 108, the electric Z control unit can have an absolute coordinates reading capability and a Z direction moving control capability based on the absolute coordinates.

The microscope image captured by the video camera 105 is input to the capture board in a personal computer (hereinafter referred to as a "PC") 101 through a signal cable, and displayed on a monitor 102 connected to the PC 101.

The microscope 108 is connected to a microscope operating unit 103 through a signal cable. Similarly, the XY electric stage 107 of the microscope 108 is also connected to an XY stage operating unit 104 through a signal cable. The microscope operating unit 103 and the XY stage operating unit 104 are connected to the PC 101 through the respective signal cables so that the electric unit and the XY electric stage 107 can be controlled by the PC 101.

In the example shown in FIG. 1, the microscope operating unit 103 and the XY stage operating unit 104 are configured separate from the microscope 108, but the microscope operating unit 103 and the XY stage operating unit 104 can be mounted in the microscope 108, and the PC 101 can be connected to the microscope 108 through a signal cable.

In the configuration, although the electric unit and the XY electric stage 107 of the microscope 108 are controlled by the PC 101, an exclusive control unit (not shown in the attached drawings) can be used without the PC 101.

Figure 2:
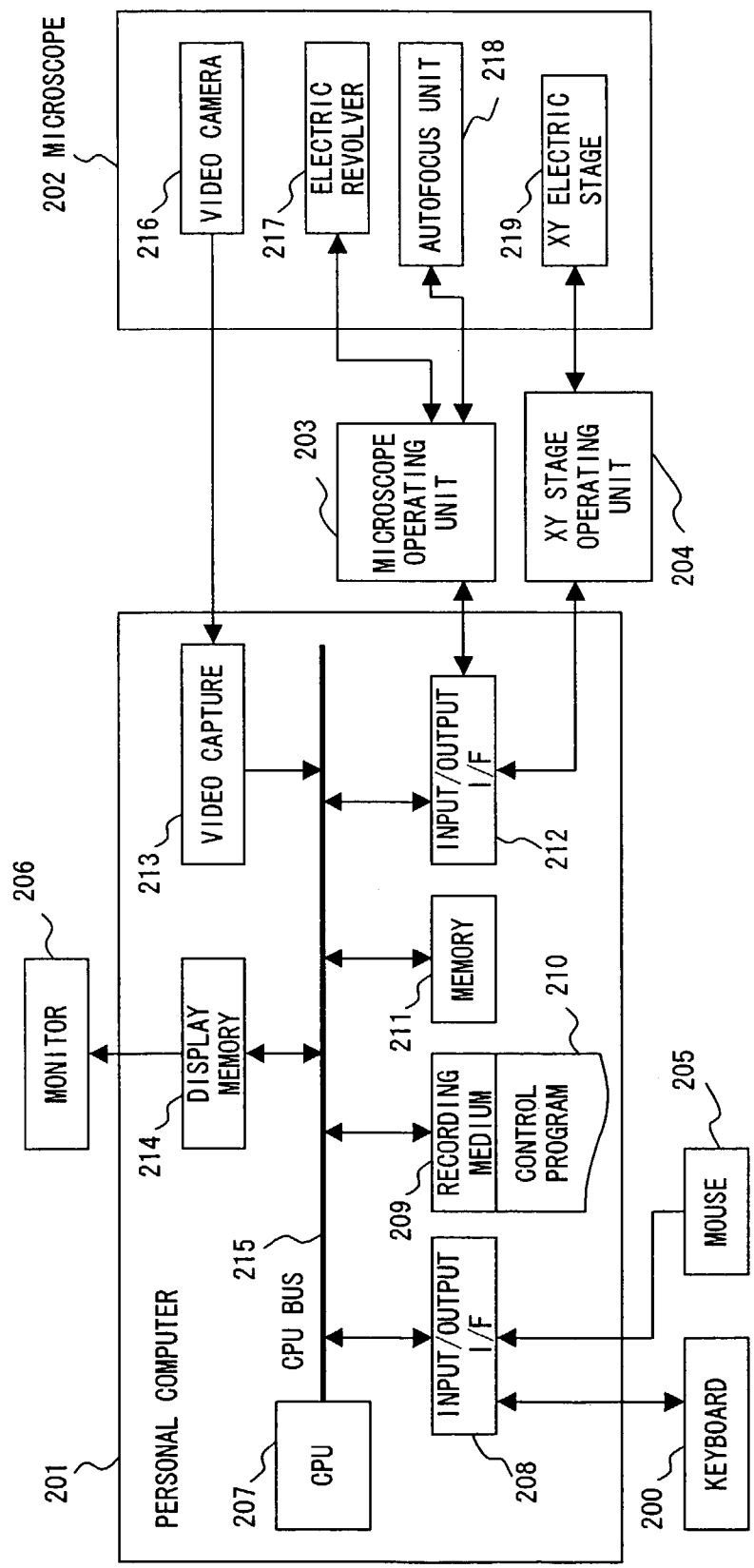
FIG. 2 shows the detailed configuration of the microscope image observation system shown in FIG. 1.

In the entire configuration of the microscope image observation system shown in FIG. 1, the detailed block diagram for easy understanding of the flow of the data in the PC 101 is shown in FIG. 2. FIG. 2 shows the same reference numerals as in FIG. 1, and the correspondence is listed below. That is, a PC 201 shown in FIG. 2 corresponds to the PC 101 shown in FIG. 1, a microscope operating unit 203 shown in FIG. 2 corresponds to the microscope operating unit 103 shown in FIG. 1, an XY stage operating unit 204 shown in FIG. 2 corresponds to the XY stage operating unit 104 shown in FIG. 1, a microscope 202 shown in FIG. 2 corresponds to the microscope 108 shown in FIG. 1, a video camera 216 shown in FIG. 2 corresponds to the video camera 105 shown in FIG. 1, an electric revolver 217 shown in FIG. 2 corresponds to the electric revolver 106 shown in FIG. 1, and an XY electric stage 219 shown in FIG. 2 corresponds to the XY electric stage 107.

The PC 201 comprises a CPU (central processing unit) 207. An input/output I/F 208 for data communications between a keyboard 200 and a mouse 205, a recording medium 209 storing a control program 210, display memory 214 for temporary storage of image data for display on a monitor 206, memory 211 for temporary storage of data being processed, a video capture 213 for fetch of a video signal from the video camera 216, and an input/output I/F 212 for communications of various control signals with the microscope operating unit 203 and the XY stage operating unit 204 are connected to the CPU 207 through a CPU bus 215.

The microscope image captured by the video camera 216 attached to the microscope 202 is input to the video capture 213 of the PC 201, and fetched by the PC 201. The fetched microscope image is expanded in the display memory 214, and displayed on the monitor 206. The control program 210 recorded on the recording medium 209 of the PC 201 has the CPU 207 perform the process sequence which relates to the present invention by being performed by the CPU 207. The control-program 210 includes a control program for control of the microscope operating unit 203 and the XY stage operating unit 204, a video capture control program for fetch of an microscope image to the video capture 213, a program for storage of a microscope image fetched by the video capture 213 in the memory 211, etc.

The recording medium 209 is not limited to semiconductor memory provided inside the PC 201 or extended later. That is, it can be a flexible disk inserted into the data read device provided in the PC 201, CD-ROM, DVD-ROM, a MO (magneto-optic) disk, or a magnetic disk mounted inside or external to the PC 201. Furthermore, the recording medium 209 can be a magnetic disk device mounted inside or external to the program server connected to the PC 201 through a communications network. In this case, a transmission signal obtained by modulating the carrier signal by the control program 210 is transmitted from the program server, the PC 201 demodulates the control program 210 using the transmission signal received through the communications network, and the CPU 207 executes the demodulated program.

When the control program 210 is loaded from the recording medium 209 by the CPU 207, and the CPU 207 starts executing the control program 210, the operation screen is displayed on the monitor 206. A microscope image fetched by the video capture 213 to the PC 201, an input button for operation of the microscope, etc. are displayed on the operation screen (not shown in the attached drawings) of the monitor 206. The operator can control the electric portions, that is, the electric revolver 217, an autofocus unit 218, and the XY electric stage 219 by operating the keyboard 200 or the mouse 205 based on the operation screen displayed according to the control program 210 using the monitor 206 connected to the PC 201.

Described below is the focal point moving control performed by the microscope image observation system according to the present invention.

In the cell diagnostics in the pathological diagnostics, since a sample itself is thick, the portion to be observed can overlap other portions.

FIG. 3A and FIG. 3B show an example of the state of the sample in the cell diagnostics. FIG. 3A indicates an image observed using the horizontal axis as X, and the vertical axis as Y. It is not determined from FIG. 3A whether or not the portion to be observed overlaps other portions in cells 300a through cells 300e. However, actually as indicated by FIG. 3B, the cells 300a through cells 300c overlap the cells 300d and 300e in the optical axis direction Z of the microscope. On the sample, there is a plurality of portions to be observed in the Z axis direction in the overlapping portions in the cells 300a through cells 300e indicating the same portions on the XY plane.

The focus cannot be correctly adjusted in the position to be observed on the sample including the overlapping portions of cells using the autofocusing capability of the microscope. In this case, it is necessary to observe the sample while shifting the position of the focal point in the optical axis direction Z of the microscope 202. Therefore, the operator repeatedly designates the control of the up and down sequentially moving in the optical axis direction Z of the microscope 202, thereby actually extracting a desired portion to be observed.

On the other hand, the present invention determines the optical-axis-direction sequential moving amount of the microscope indicate by $\Delta Z$ as shown in FIG. 3B, and the upper and lower limit to moving in the optical axis direction of the microscope indicated by Zmax and Zmin as shown in FIG. 3B, and has the PC appropriately control the up and down sequential moving in the optical axis direction of the microscope.

First, the optical-axis-direction sequential moving amount corresponding to the $\Delta Z$ shown in FIG. 3B is calculated.

The microscope has a focal range referred to as the depth of focus. The depth of focus is determined by the numerical aperture (NA) of the object lens and the wavelength of light ($\lambda$), and the depth of focus can be obtained by $$d=\lambda/(2 \cdot NA \cdot NA)$$

The numerical aperture is represented by, for example, NA=0.65 on the object lens of the microscope, and indicates the performance of the object lens. The larger the value of the numerical aperture is, the higher the resolution (the capability of correctly determining two points which are slightly separate from each other) is, but the shallower the depth of focus is. Furthermore, when the wavelength of light for observation is changed, the resolution and the depth of focus also change. That is, when a red light is changed into a blue light, the wavelength of light becomes shorter. Therefore, a finer portion can be observed, but the depth of focus becomes further shallower.

According to the present invention, the optimum amount of sequential moving ($\Delta Z$ shown in FIG. 3B) in the optical axis direction of the microscope is set based on the depth of focus. That is, $\Delta Z$ is determined by $$\Delta Z=d/n$$

where it is desired that the value of n is a half of the value of the depth of focus (that is, n=2). In the present embodiment, the value is applied, but any value can be set without a problem.

Since the depth of focus d depends on each object lens, the numerical aperture data for each object lens is written to the control program 210 of the recording medium 209. That is, the table indicating the correspondence between the name and the numerical aperture (NA) of the object lens of the microscope as shown in FIG. 4 is recorded on the control program 210. Although the wavelength of light perceived by human eyes is about from 380 to 780 nanometers, the control program 210 of the recording medium 209 defines the initial value of the wavelength of light as 500 nanometers, and the control program 210 can be generated to change the wavelength by the control of the dimmer unit depending on the operation on the operation screen displayed on the monitor 206 of the PC 201.

Thus, the optimum amount of sequential moving in the optical axis direction of the microscope can be determined according to the information about the numerical aperture of the object lens of the microscope and the wavelength of light.

Described below is the setting of upper and lower limit to moving in the optical axis direction of the microscope corresponding to Zmax and Zmin shown in FIG. 3B.

The upper and lower limit to moving can be determined by assuming that there are a plurality of overlapping portions in the value of the size of a cell. However, it is considered that there are abnormal cells larger than (or smaller than) normal cells. That is, it is assumed that there are k cells the size of each of which is set as m times as large as a normal cell.

$$(Zmax-Zmin)=(\text{size } S \text{ of normal cell}) \cdot m \cdot k$$

where the upper and lower limit width of moving in the optical axis direction of the microscope is set. The control program 210 of the recording medium 209 is generated such that the size S of a normal cell, the estimated value m of the size of an abnormal cell, and the estimated value k of the overlapping level of cells in the equation above can be changed or set on the operation screen displayed on the monitor 206 of the PC 201.

Since the upper and lower limit width of moving (Zmax−Zmin) in the optical axis direction of the microscope is determined as described above, the absolute coordinates of the Zmax and Zmin are determined next by determining Zc indicating the central position between the Zmin and Zmax. The Zc indicating the central position can be determined by using the autofocusing capability of the autofocus unit 218 of the microscope 202 and obtaining the position of the focal point depending on the autofocus. When Zc is obtained, the absolute coordinates of Zmax and Zmin can be determined by the following equations.

$$Zmin=Zc-(\text{Upper and lower limit width of moving})/2$$

$$Zmax=Zc+(\text{Upper and lower limit width of moving})/2$$

In the method of determining the absolute coordinates of the Zmax and Zmin, the position Zc of the center between the Zmax and Zmin is determined using the autofocusing capability of the microscope. The position of the Zc can be determined by obtaining the position based on the position of the focal point set by the operator changing the position of the focal point by manually operating the sequentially moving handle (not shown in the attached drawings) of the microscope 202.

In the above-mentioned determining methods, it is obvious that there is the condition to be met that the position of Zmax is set such that the sample set on the XY electric stage 219 of the microscope 202 does not contact the object lens (not shown in the attached drawings) attached to the electric revolver 217.

Described below is another method in addition to the above-mentioned method of determining the absolute coordinates of Zmax and Zmin after determining the position of the Zc which can be the center by using the autofocusing capability of the microscope. This method is to first set the lower limit to moving Zmin, and then sets the upper limit to moving Zmax.

In this method, the position of the focal point is set to the lower limit position of the autofocus zone in the optical axis direction of the microscope (hereinafter referred to as a "autofocus lower limit position"). The autofocus zone is prescribed by an autofocus unit for processing the autofocusing capability of the microscope.

Since focus is not achieved on a sample normally in the autofocus lower limit position, the object lens is moved toward the upper limit in the optical axis direction of the microscope from the autofocus lower limit position, and the autofocus unit is to obtain the first position in which focus can be achieved. The method of moving the object lens to the position in which focus can be achieved can be manually operating the sequentially moving handle (not shown in the attached drawings) of the microscope 202, or allowing the PC 201 to instruct the microscope operating unit 203 to control the sequential moving in the optical axis direction of the microscope.

As a result, the object lens is moved toward the upper limit from the autofocus lower limit position, and the position of the focal point in which focus can be first attained is determined as the lower limit to moving Zmin. From the Zmin, the upper limit to moving Zmax is obtained as follows.

$$Zmax = Zmin + (\text{normal cell size } S) \cdot m \cdot k$$

Thus the upper limit to moving can be determined.

In the above-mentioned example, the upper limit to moving Zmax is determined after first determining the lower limit to moving Zmin. However, in the inverse order, the upper limit to moving Zmax can be first determined, and then the lower limit to moving Zmin can be determined in the similar procedure.

In the above-mentioned determining method, the upper and lower limit width of moving (Zmax−Zmin) in the optical axis direction of the microscope is determined based on the size of a cell. In this connection, the control program 210 can be generated such that the number of fetched images in different positions of the focal points on the same plane (on the plane perpendicular to the optical axis direction of the microscope) and the upper and lower limit to moving of the microscope can be arbitrarily set on the control screen displayed on the monitor 206 connected to the PC 201.

Figure 5:
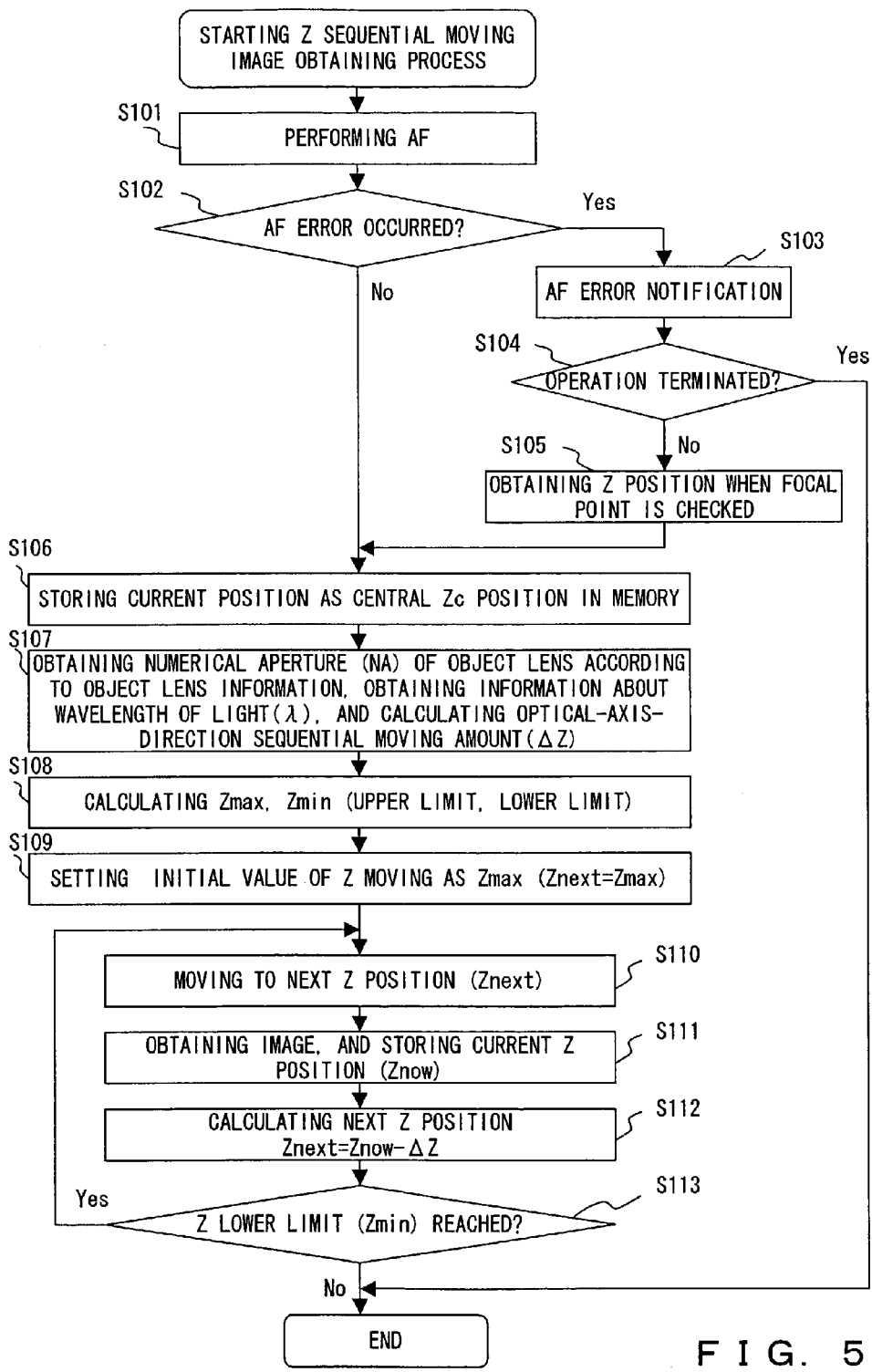
FIG. 5 is a flowchart of the sequence of capturing microscope images.

As described above, the optical-axis-direction sequential moving amount ($\Delta Z$) of the microscope and the upper and lower limit to moving (Zmax, Zmin) of the optical axis direction of the microscope are determined. FIG. 5 is a flowchart of the sequence of fetching the microscope image using the $\Delta Z$, Zmax, and Zmin performed by the CPU 207 executing the control program 210, and the sequence (a Z sequential moving image obtaining process) is described below by referring to FIG. 5.

First, in S101, an "AF performing" process is performed. That is, the autofocusing process is performed by obtaining an instruction to execute an autofocusing (AF) capability for determining the reference Z position on the optical axis of the microscope. The autofocusing process is performed by an execute instruction on the autofocus button (not shown in the attached drawings) on the operation screen displayed on the monitor 206 of the PC 201.

When an autofocus instruction is obtained on the operation screen, a control signal for the execution of the autofocusing process is transmitted from the input/output I/F 212 of the PC 201 to the microscope operating unit 203, the autofocus unit 218 in the microscope 202 is driven, and the optimum position of the focal point can be automatically detected on the slide.

In S102, it is determined whether or not "An AF error has occurred?". That is, it is determined whether or not an execution error (AF error) has occurred in S101. If an AF error has occurred (the result of the determination in S102 is YES), then an "AF error notification" process is performed in S103. That is, an autofocus error notification is displayed on the operation screen displayed on the monitor 206 of the PC 201. When an autofocus error has occurred, the autofocus unit 218 of the microscope 202 notifies the microscope operating unit 203 of the error, and the microscope operating unit 203 notifies the PC 201 of the error through the input/output I/F 212. Thus, the CPU 207 recognizes the error, the error display capability programmed in the control program 210 is executed, and the error notification is displayed on the monitor 206 of the PC 201.

The operator of the PC 201 recognizes the autofocus error on the monitor 206. When the operator recognizes the autofocus error, it is prompted to determine whether or not the operation is to be terminated, and the determination result is input to the PC and obtained by the CPU 207. It is determined whether or not "The operation is to be terminated?" in S104. That is, if the determination result indicates the termination of the operation (if the result of the determining process in S104 is YES), then the sequence terminates. On the other hand, if the obtained determination result indicates the request of the operator to continue the image fetching operation (if the result of the determining process in S104 is NO), then the focal adjustment portion (not shown in the attached drawings) of the microscope is manually operated by the operator.

When the focal adjustment portion of the microscope is manually operated to determine the position of the focal point, and the operator presses the "determination" button on the operation screen, the process of "obtaining the Z position when the focal point is checked" is performed in S105. That is, the contents of the operation are obtained by the CPU 207. Then, in S106, the process of "setting the current position as the central Zc position and storing it in the memory" is performed. That is, the position of the focal point when the "determination" button is pressed is set as the central Zc position, and the process of storing data indicating the position n the memory 211 is performed.

The control program 210 is generated to instruct the CPU 207 to perform the control such that although the AF error has not occurred when the autofocusing process is performed in S101 (although the result of the determining process in S102 is NO), the process in S106 can be performed, the position of the focal point obtained as a result of the normal termination of the autofocusing process can be set as the central Zc position, and the data indicating the position can be stored in the memory 211. Although not shown in the flowchart in FIG. 5, the process of prompting the operator to determine whether or not the position of the focal point when the autofocusing process is normally completed is acceptable can be inserted before executing the process in S106 when the determination result in S102 is YES. If the operator is not satisfied with the position, then the CPU 207 can be instructed to allow the operator to perform the process (S104 and S105) of manually operating the focal adjustment portion of the microscope as when the autofocus error occurs.

When the reference and central Zc position is determined in the above-mentioned processes, then the process of "obtaining the numerical aperture (NA) of the object lens according to the object lens magnification information, obtaining the wavelength of light ($\lambda$), and calculating the optical-axis-direction sequential moving amount of the storage medium ($\Delta Z$)" is performed in S107. That is, the optimum amount of sequential moving ($\Delta Z$) in the optical axis direction of the microscope is determined according to the information about the numerical aperture (NA) of the object lens currently being used and the information about the wavelength of light (λ). The equation for computing ΔZ is presented below.

$$\Delta Z = \lambda/(n \cdot 2 \cdot NA \cdot NA)$$

where n is normally 2, but can be variable depending on the settings, and can be conveniently changed on the operation screen displayed on the monitor 206 of the PC 201.

The information about the object lens (and the magnification) currently attached to the microscope 202 is transmitted from the microscope operating unit 203 through the input/output I/F 212. Furthermore, the table (FIG. 4) which is included in the control program 210 and indicates the relationship between the object lens and the numerical aperture is referred to, and the numerical aperture of the object lens is obtained from the name of the object lens currently attached to the microscope 202.

It is also assumed that the value (λ) indicating the wavelength of light can be set on the operation screen being displayed on the monitor 206 of the PC 201.

When the optimum amount of sequential moving (ΔZ) in the optical axis direction of the microscope is determined, the process of "calculating Zmax and Zmin (upper limit and lower limit) is performed in S108. That is, the upper and lower limit to moving (Zmax, Zmin) in the optical axis direction of the microscope is calculated, and the calculation result is stored in the memory 211. The values of Zmax and Zmin are obtained by the following equations.

$$Zmax = Zc + (\text{upper and lower limit width of moving})/2$$

$$Zmin = Zc - (\text{upper and lower limit width of moving})/2$$

where Zc indicates the value of the central Zc position stored in the memory 211 in the process in S106. The upper and lower limit width of moving is calculated by the following equation.

$$(\text{upper and lower limit width of moving}) = (\text{normal cell size } S) \cdot m \cdot k$$

As described above, since an abnormal cell can be larger (or smaller) than a normal cell, the size of a cell is set as m times the size of a normal cell, and the range of motion is determined with k overlapping cells taken into account.

The control program 210 is generated such that the size S of a normal cell for determination of an upper and lower limit width of moving, the expansion (or reduction) magnification m of an abnormal cell, and the overlapping coefficient k of cells can be set/changed on the operation screen displayed on the monitor 206 of the PC 201.

When the Zmax and Zmin are determined by performing the above-mentioned calculation, the process of "setting the initial value of Z moving as Zmax" is performed in S109. That is, the process for determining the initial position of the focal point (initial value of Z moving) in the optical axis direction of the microscope when the process of fetching a microscope image is started is performed. According to the present embodiment, the initial value of Z moving Znext is set as Zmax, but it is obvious that Zmin can be an initial value. In this example, Znext indicates the position of the focal point in the optical axis direction of the microscope when a microscope image is fetched next. If the value Znext is determined, the process of "moving to the next Z position (Znext)", that is, the process of moving the position of the focal point in the optical axis direction of the microscope to the position corresponding to Znext, is performed in S110.

After moving the position of the focal point, the process of "obtaining an image and storing the current Z position (Znow)", that is, the process of obtaining a microscope image through a capture board and storing the image data together with the information about the current position of the focal point in the memory 211, is performed in S111.

When the image data of the microscope images is completely stored, the "calculating the next Z position", that is, the calculation of the moving to the next position of the focal point in the optical axis direction of the microscope, is performed in S112. The equation for determination of the position is represented as follows.

$$Znext = Znow - \Delta Z$$

The value of the result obtained by subtracting the optimum amount of sequential moving (ΔZ) in the optical axis direction of the microscope from the current position of the focal point (Znow) stored in the process in S111 is set as the next position of the focal point.

When the calculation of the next position of the focal point is completed, the determination whether or not "the Z lower limit (Zmin) has not been reached?", that is, the determination whether or not the calculation result indicates the above-mentioned Zmin (lower limit to moving), is made in S113. As a result of the determination, if Zmin has not been reached (if the result of the determining process in S113 is YES), then the calculation result is set as the next position of the focal point (Nnext), and control is returned to the moving process in S110.

Afterwards, the processes from S110 to S112 are repeated until the position of the focal point of the optical axis direction of the microscope reaches Zmin. If the value of Znext has reached Zmin (lower limit) (if the result of the determining process in S113 is NO) after the process in S112, then the process shown in FIG. 5 terminates.

The process described above is performed to obtain a microscope image in cooperation with several sequential moving processes in the optical axis direction (Z) of the position of the focal point of the microscope.

Described below is the method of displaying the microscope image obtained as described above on the monitor 206 of the PC 201.

The microscope images sequentially obtained with the position of the focal point moved by sequential moving are stored in the memory 211 of the PC 201 together with the obtained information about the position of the focal point of the microscope. The obtained microscope image can be displayed on the monitor 206 of the PC 201 by retrieving the information from the memory 211 of the PC 201. That is, the microscope image can be displayed on the monitor 206 of the PC 201 by the CPU 207 of the PC 201 reading the microscope image information from the memory 211 and writing the read information to the display memory 214. At this time, although there are the problems with the processing speed of the CPU 207 and the data transmission speed of the CPU bus 215, it is possible to observe the microscope images as moving pictures on the monitor 206 of the PC 201 if the switching speeds is as high as nearly 20 displayed images per second. If there is a hardware configuration of transferring direct memory addresses (DMA) in the transmission of data by accessing the display memory 214 from the memory 211 of the PC 201 without using the CPU 207, the moving pictures can be observed on the monitor 206 of the PC 201 although the processing speed of the CPU 207 is low.

Furthermore, the moving picture data can be stored in the memory 211 and displayed as moving pictures on the monitor 206 of the PC 201 by using the MPEG (moving picture experts group) technology, which is one of the standards of the moving picture coding technology, sequentially retrieving microscope image data obtained by sequentially moving the position of the focal point of the microscope in the optical axis direction from the memory 211, generating the moving picture data obtained by analyzing and coding the portions whose image data have changed by the moving and storing the data in the memory 211, and executing the MPEG data display software programmed in the control program 210 stored in the recording medium 209 by the CPU 207. Furthermore, like the MPEG 4 Standard in which the image of the frame can be analyzed into objects, and the difference of each of the objects is recorded, the moving picture data of small data size can be generated by recording only the differences of the data of cell portions in the image data analyzed into the background and the cell portions, thereby successfully reducing the amount of transfer data.

By the above-mentioned processes, the images obtained by sequentially moving the position of the focal point of the microscope in the optical axis direction can be observed as moving pictures on the monitor 206 of the PC 201.

When the microscope image in an arbitrary position of the focal point is to be displayed, the monitor 206 of the PC 201 can display a scroll bar as disclosed by the Japanese Patent Application Laid-open No. Hei 6-250097 so that the position of the focal point can be varied, or the a microscope image is obtained after changing the position of the focal point by turning a scroll button using an intelligent mouse capable of directly controlling the scroll bar, and then displayed. It is obvious that a microscope image is obtained and displayed by changing the position of the focal point depending on the operation of an optional button on the keyboard, for example, the up-and-down moving cursor button. Furthermore, two-dimensional images captured at the respective positions of the focal point are combined into one image to be generated and viewed as a three-dimensional image.

As described above, the microscope images are obtained and moving pictures are observed while moving the position of the focal point in the optical axis direction of the microscope.

Described below is the method of improving the quality of an obtained image when the image is obtained while sequentially moving the position of the focal point in the optical axis direction of the microscope.

As shown in FIG. 3, when a number of portions are overlapping in an observed position, the obtained image is dark although the transmitting light of the microscope is given to the observed position, and the exposure at the point to be observed is low if there are a number of background images on the entire screen. In this case, since the microscope image to be observed is unclear, and it is difficult to correctly observe the image. In the method described below, the quality of the image can be improved.

Figure 6A:
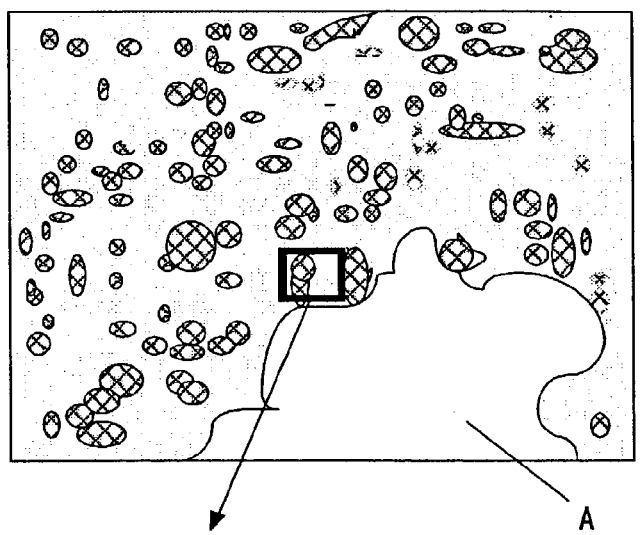
FIG. 6A, FIG. 6B, and FIG. 6C show an unclear microscope image.
Figure 6B:
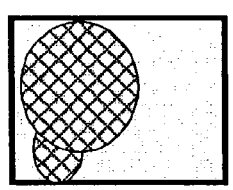
Figure 6C:
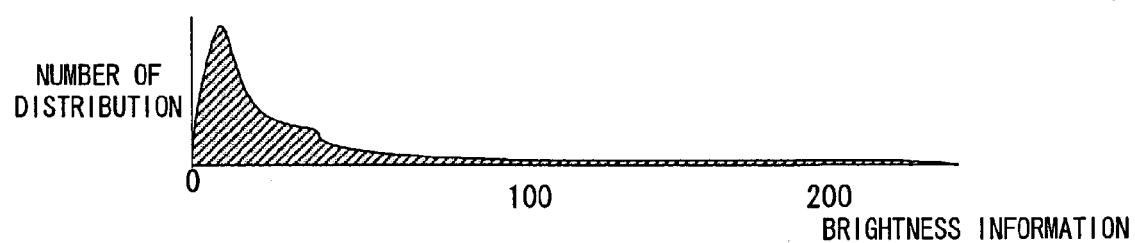

FIG. 6A, FIG. 6B, and FIG. 6C show the above-mentioned problems.

FIG. 6A shows the microscope image to be observed. The microscope image shown in FIG. 6A is formed by a background portion (indicated by the character A in FIG. 6A) and other sample portions. There is a plurality of nuclei to be observed in the sample portions. In FIG. 6A, the nuclear portions are indicated as a plurality of diagonal-line areas.

Since the above-mentioned image occupies a large ratio of the background area (indicated by the character A) in the entire area, underexposure occurs on the nuclear portions to be observed, thereby generating a darker image.

FIG. 6C shows the distribution of the information about the brightness of each pixel configuring an extracted area in FIG. 6B showing an arbitrary nuclear portion extracted from the microscope image shown in FIG. 6A. In this example, one (for example, G (green)) of the primary colors of light, that is, R (red), G (green), and B (blue) is shown.

In FIG. 6C, a number of pixels are distributed around the portion having the brightness value of 0. In this state, the portion to be observed (that is, the portion shown in FIG. 6B) is displayed dark. Therefore, the quality of the image can be improved according to the brightness information about each pixel and the distribution of the pixels such that the area of the portion to be observed can have an appropriate brightness value.

Figure 7:
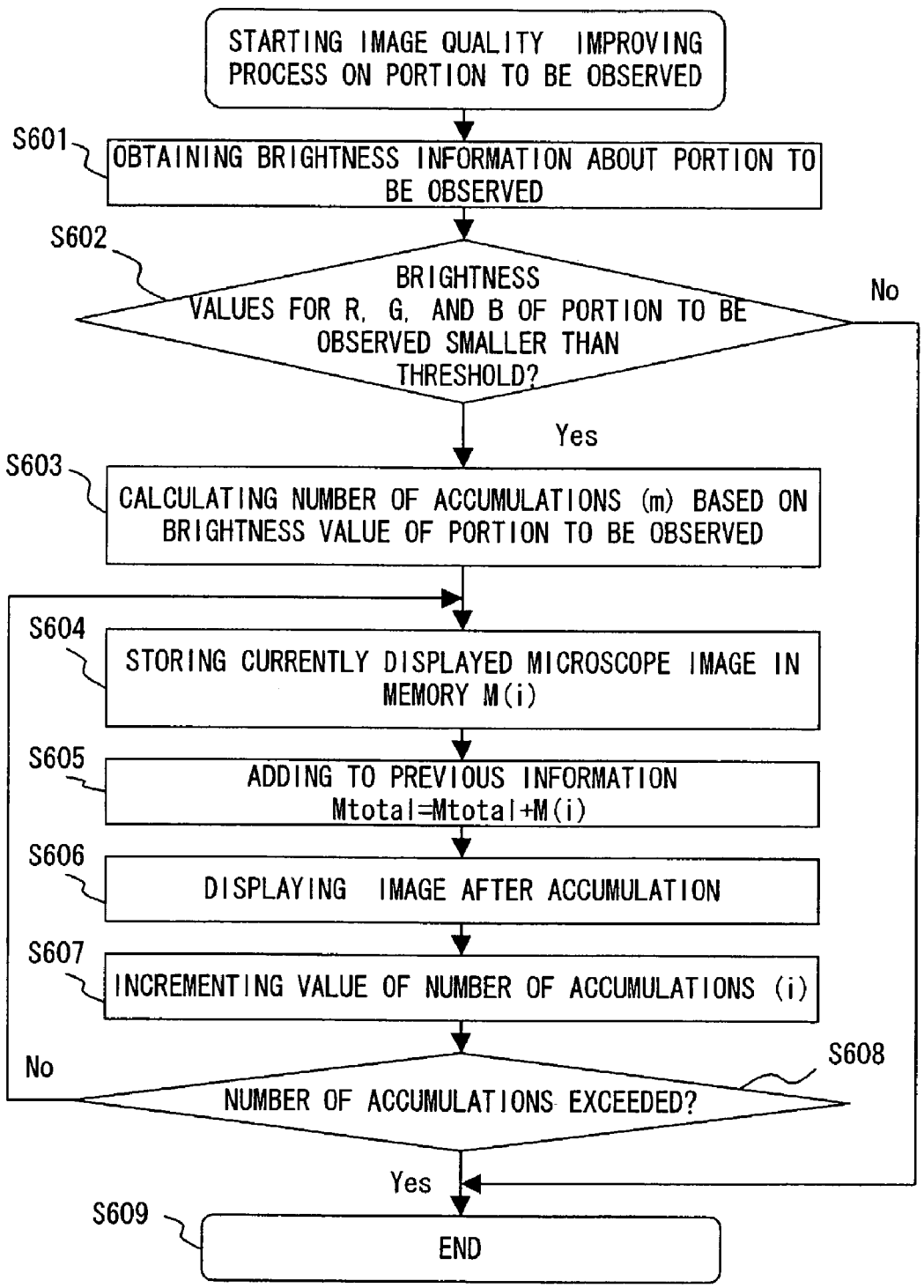
FIG. 7 is a flowchart of the contents of the image quality improving process of an observed portion of a microscope image.

The contents of the image quality improving process on a portion to be observed in a microscope image are described by referring to the flowchart shown in FIG. 7.

When the image quality improving process is started on the portion to be observed in the microscope image, the process of "obtaining the brightness information about the portion to be observed" is performed in S601. That is, the brightness information (brightness value) about an arbitrary pixel is obtained for the three channels of R, G, and B. The settings of the coordinates (x, y) of an arbitrary pixel of the portion to be observed refer to, for example, the coordinates indicating the portion on which the operator clicks on the microscope image displayed on the monitor 206 of the PC 201 using the mouse 205. Assume that the brightness values of the R, G, and B of the arbitrary pixel represented by the coordinates (x, y) of the portion to be observed obtained in the process above are R (x, y), G (x, y), and B (x, y). The largest value of the three brightness values is the brightness value for use in a calculation.

Then, in S602, it is determined whether or not "the brightness values R, G, and B of the portion to be observed are smaller than a predetermined threshold", that is, whether or not the brightness value b of the portion is smaller than an arbitrary threshold. The threshold can be set by, for example, generating the control program 210 such that the operator can optionally set the threshold, and setting the initial value of the brightness value b as a half of the largest brightness value (for example, 128 when the gray scale of the color of the microscope image has 256 levels). The initial value is set as a half of the brightness value so that, when the values of images are accumulated as described later, the accumulated value cannot overflow. Although not shown in FIG. 7, if the brightness of the portion to be observed is equal to or larger than a threshold, but smaller than an arbitrary value (for example, 150 in the 256 gray scale levels), then the brightness value of each pixel can be set as a predetermined value which does not cause an overflow with a view to enhancing the contrast of the image.

If the brightness value of the portion to be observed is larger than a threshold as a result of the determining process in S602 (NO as a determination result), then the microscope image can be used as is, and the process terminates (S609). Inversely, when the brightness of the portion to be observed is smaller than the threshold in S602 (YES as a determination result), the quality of the image is improved.

With an image having a small brightness value as described above, there is the possibility that noise is apparent on the image. Therefore, a better image can be effectively obtained by accumulating images after obtaining a plurality of images rather than by accumulating the brightness values of the respective pixels using the same image and a predetermined value.

The accumulation of the images performed according to the flowchart shown in FIG. 7 is realized by the accumulation of the brightness values of the respective pixels using software, but it can also be realized by setting the video camera 216 such that the accumulation time of the CCD (charge coupled device), which is a pickup device of the video camera 216, can be extended. In this case, the function of externally controlling the video camera 216 and an input/output IF for externally controlling the video camera 216 from the PC 201 are to be added (not shown in FIG. 2).

Described below is the accumulation of images by software.

First, in S603, the process of calculating the number of accumulations (m) is performed based on the brightness values of the pixels in the portion to be observed. The equation for calculating the number of number of accumulations (m) is expressed below.

$$m=256/b$$

where b indicates the brightness value of the pixel of the portion to be observed using 256 gray scale levels. The value of the number of accumulations (m) is an integer obtained by truncating the decimal places of the calculation result.

Then, in S604, the microscope image displayed (currently being displayed) is stored in the memory 211 of the PC 201. "i" indicates an accumulation counter, "M" indicates the generic name of the data stored in the memory 211, and M(i) indicates the i-th obtained microscope image data.

In S605, the microscope image data M(i) stored in the process in S604 is added to the previous information (accumulation result of the microscope image data up to the previous accumulation). Assuming that the generic name of the image data obtained as an addition result is Mtotal, the calculation is performed by the following equation.

$$M\text{total}=M\text{total}+M(i)$$

where the brightness values of the pixels of the same coordinates are accumulated.

Then, in S606, an image is displayed based on the accumulation result data Mtotal in "displaying an image after accumulation", that is, in S605. The display of an image after accumulation can be performed when all accumulating processes are completed.

After completing the display of images in S606, the accumulation counter i is incremented by 1 (1 is added) in S607, and then it is determined in S608 whether or not the value of i has exceeded the number of accumulations (m) by comparing the value of i with the number of accumulations (m) determined in the process in S603. As a result, if the value has not exceeded the number of accumulations (m) (if the determination result in S608 is NO), then control is returned to the sample in S604 in which a currently displayed microscope image is stored in the memory. On the other hand, if it is determined in S608 that the number of accumulations has been exceeded (if the determination result in S608 is YES), then the image quality improving process terminates (S609).

In the flowchart shown in FIG. 7, the accumulating process terminates if the value of the accumulation counter i has exceeded the number of accumulations (m). However, there is the possibility that an image of a portion to be observed is covered with noise when the brightness value of the portion to be observed is very small. Therefore, the noise can be reduced by obtaining an average value of the brightness values of a plurality of images.

Thus, an image whose quality has been improved on the portion to be observed can be obtained.

Second Embodiment

Figure 8:
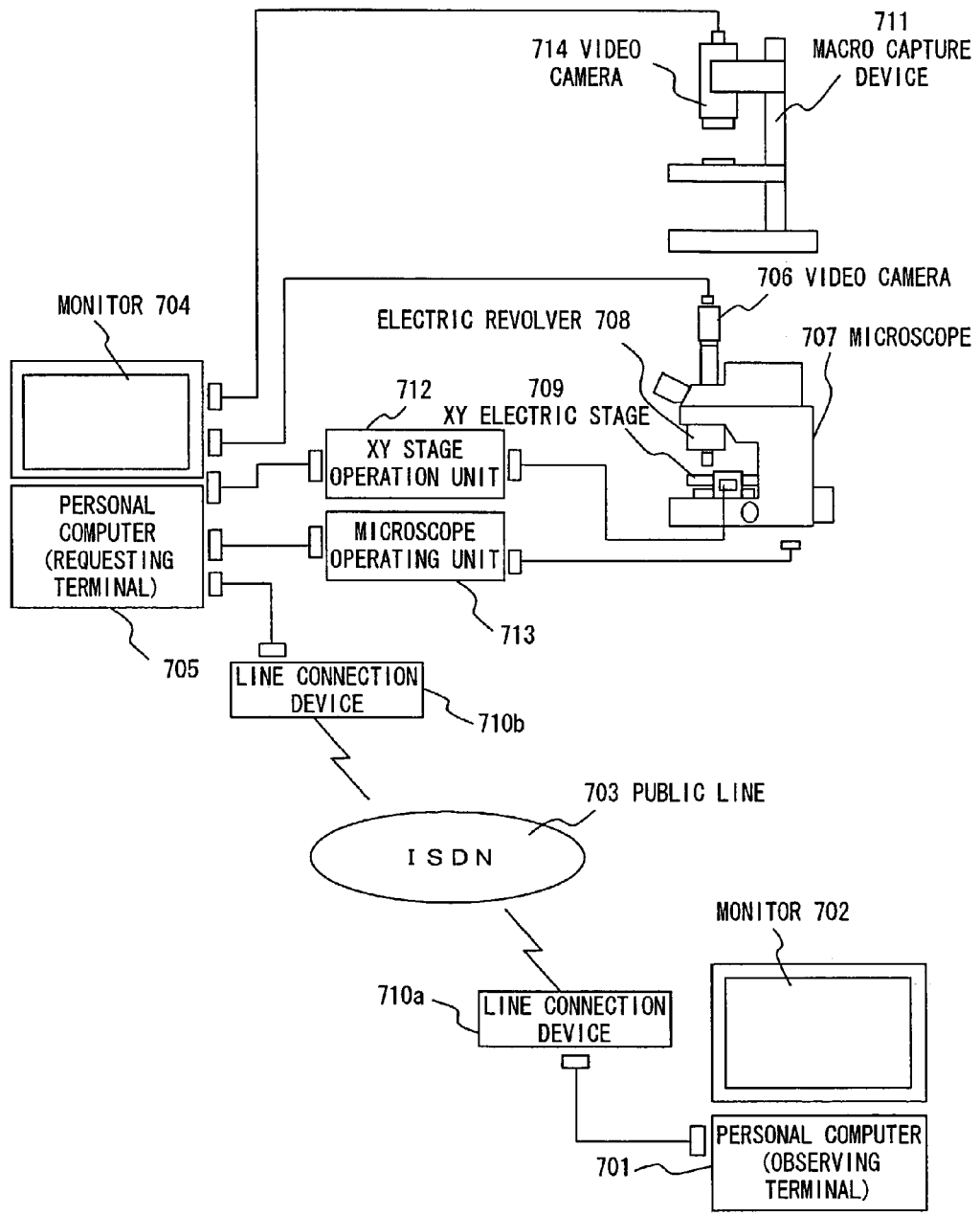
FIG. 8 shows the configuration of the entire microscope remote observation system according to the second embodiment of the present invention.

FIG. 8 shows the configuration of the microscope remote observation system for use in the telepathology, teleconsultation (to provide medical support through the communications among doctors and those who are involved in the medical field), etc. according to the second embodiment of the present invention.

A microscope 707 comprises an XY electric stage 709, an electric revolver 708, and a video camera 706. The microscope 707 further comprises an autofocus unit, a dimmer capability, an electric diaphragm unit, etc.

In the example shown in FIG. 8, a microscope operating unit 713 is connected to a PC 705, and the operation data is transferred from the PC 705 to the microscope operating unit 713, thereby performing electric portions of the microscope 707 such as the control of object lens, the AF control, the dimmer control, the electric diaphragm control, etc. The PC 705 has the video capture capability not shown in the attached drawings, and is connected to the image output of the video camera 706. Although the PC 705 and the PC 701 which is an observing terminal comprises a storage medium for storing the information about an image, etc., a storage device such as an MO, etc. can be provided as peripheral equipment of the PC. Monitors 702 and 704 are connected to the PCs 701 and 705, and a microscope image and an image of the macro capture device are observed through the monitor 702 or 704.

Furthermore, a line connection device 710b for transmission of information such as image information, etc. through a public line 703 is prepared, and the line connection device 710b comprises an interface with the PC 705. The PC 705 and a PC 701 are connected through line connection devices (710a, 710b) and a public line 703 for communications of various data among them. Although an ISDN (integrated services digital network) is used as the public line 703 in the present embodiment, but a simple communications line such as a LAN (local area network), etc. can also be used.

When the microscope remote observation system shown in FIG. 8 is used as a telepathology system for remotely performing pathological diagnostics, the PC 705 is mounted as a PC terminal without a pathologist, and the PC 701 is mounted as a PC terminal with a resident pathologist. Normally, a requesting terminal comprises a macro capture device 711 for capturing the entire image of a sample on the slide, and the microscope 707 for observation of a magnified sample. On the other hand, the observing terminal normally does not require a macro capture device, a microscope, etc., but they also can be connected to the PC 701.

Described below is an example of remotely obtaining a sequential moving image in the optical axis (Z) direction of the microscope using the microscope remote observation system with the above-mentioned configuration.

Figure 9:
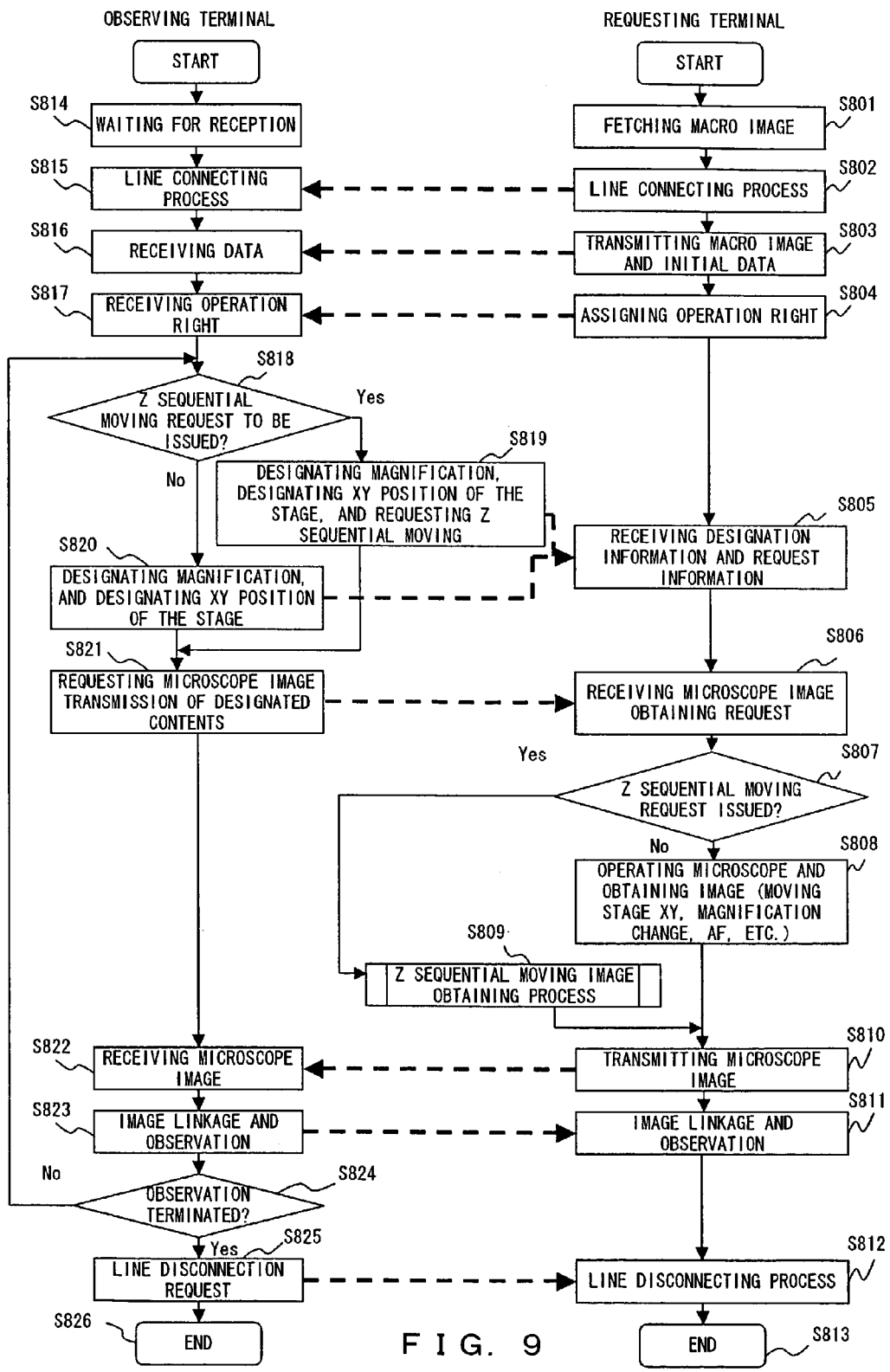
FIG. 9 is a flowchart of the sequence of the operations of obtaining and transmitting microscope images by the microscope remote observation system shown in FIG. 8.

FIG. 9 is a flowchart of the sequence for the operations of obtaining and transmitting a microscope image in the microscope remote observation system shown in FIG. 8.

In FIG. 9, the flowchart on the left shows the control sequence performed by an observing terminal (performed by the CPU of the PC 701 by executing the control program stored in advance in the storage device of the PC 701), and the flowchart on the right shows the control sequence performed by a requesting terminal (performed by the CPU of the PC 705 by executing the control program stored in advance in the storage device of the PC 705).

First, the macro capture device 711 is operated by the requesting terminal, and a macro image is fetched in S801, that is, an entire image (hereinafter referred to as a "macro image") of a sample on the slide to be tested on the observing terminal is fetched to the PC 705. If the entire image of the macro image can be observed using an object lens of low magnification provided for the microscope 707, then the slide can be put on the microscope 707 so that the image can be fetched at the optimum object lens magnification. Furthermore, the object lens of the microscope 707 can be set at low magnification, images can be sequentially fetched after moving the stage with the vision taken into account, and then the images can be combined and generated as a macro image.

The macro image captured by a video camera 714 of the macro capture device 711 is fetched by a video capture board (not shown in the attached drawings) of the PC 705, and the data representing the macro image is sequentially written to the display memory, thereby displaying the image on the monitor 704 of the PC 705. The macro image is fetched by the trigger of the operator operating a predetermined switch. The switching operation can be realized by, for example, recognizing the operation button provided on the application software displayed on the monitor 704 of the PC 705 by an event of a mouse click, etc. or recognizing it by detecting the operation on the switch of the external operation panel not shown in the attached drawings.

When the operation of fetching a macro image is completed, the "line connecting process" is performed in S802, and a line connection request is issued from the PC 705 to the PC 701. The PC 701 has entered the reception waiting state so that a line connection request can be received by the "reception waiting" process in S814.

The digital data indicating the line connection request issued by the PC 705 is transferred to the PC 701 through the line connection devices (710a, 710b) and the public line 703 such as an ISDN, etc. The line connecting process is a process of returning the data (not shown in the attached drawings) indicating the connection permission to the connection requester if there is no problem after recognizing the connection requester (PC 705 in this example).

If the line is established, the PC 705 transmits the macro image and initialization data to the PC 701 in S803. The initialization data includes the information (type of the microscope 707, the macro capture device 711, the video cameras (706, 714), etc.) about hardware connected to the PC 705.

After these pieces of data are received by the PC 701 in the "data receiving" process in S816, the operation right is assigned from the PC 705 to the PC 701 in the process of "assigning an operation right" in S804. The operation right shows the right to perform various operations on the microscope 707 such as controlling the stage, designating a fetch of an image, etc. The change of the operation right can be immediately made when a line connection is established, or by an operation switching at an optional timing by clicking an operation button of the application software displayed on the monitor 704. In the example shown in FIG. 8, after a macro image is fetched to the PC 705, the operation right is passed to the PC 701.

When the operation right is received by the PC 701 in the "operation right receiving" process in S817, the operator operating the PC 701 can remotely perform the microscope image diagnostics by observing the microscope image transmitted from the PC 705 on the monitor 702 of the PC 701. Furthermore, the operator of the PC 701 can remotely instruct the PC 705 to obtain an image in a desired stage position and at desired microscope object lens magnification based on the observation result of the received macro image.

In S818, when the operator of the PC 701 determines "whether or not a Z sequential moving request is to be issued", that is, whether or not, when the PC 701 instructs PC 705 to magnify the object lens magnification of the microscope, the instruction includes a request for a sequential moving in the optical axis direction of the microscope (Z sequential moving). If the Z sequential moving request is not included (NO as a determination result in S818), then the process of "designating magnification and designating an XY position of the stage, that is, the process of the operator inputting the designation information about the next magnification and the designation information about the XY position of the stage to the PC 701, and transmitting the data of the designation information to the PC 705, is performed in S820. If the Z sequential moving request is included (YES as a determination result in S818), then the process of "designating the magnification, designating the XY position of the stage, and the Z sequential moving request", that is, the process of transmitting the designation information about the next magnification, the designation information about the XY position of the stage, and the Z sequential moving request to the PC 705, is performed in S819.

The PC 705 performs the process of "receiving designation information and request information" in S805, and receives the designation information and request information.

Then, the PC 701 performs the process of "requesting a microscope image transmission of designated contents" in S821, and transmits a request to transmit a microscope image according to the previously transmitted magnification designation information to the PC 705.

The PC 705 receives the microscope image transmission request in S806, it is determined in S807 whether or not a Z sequential moving request has been issued, and it is determined whether or not the object lens magnification designation received previously includes a Z sequential moving request. If the Z sequential moving request is not included (NO as a determination result in S807), then the microscope is controlled by making the designated change of the microscope object lens magnification, moving the XY position of the stage, performing the autofocus (AF), etc. in S808, and then the process of obtaining the microscope image is performed. The microscope image is, for example, input into the capture board (not shown in the attached drawings) shown in PC 705, and processed as a still image. When the image is converted into still image data, the image data can be compressed by the JPEG (Joint Photographic Experts Group) system, etc., and stored in a storage medium.

If it is determined in the determining process in S807 that the Z sequential moving request is included (YES as a determination result in S807), the Z sequential moving image obtaining process is performed in S809. In the Z sequential moving image obtaining process, the microscope image fetching sequence shown in FIG. 5 is performed, and the microscope image data is obtained as moving picture data. When the microscope image is obtained, the image quality improving process on the portion to be observed shown in FIG. 7 can be performed.

The coordinates of the portion to be observed can be designated by the PC 701, and the coordinates are designated by the mouse clicking operation, etc. on an optional position on the macro image displayed on the monitor 702 or the microscope image, and the data indicating the coordinates is transmitted to the PC 705.

After completely obtaining the image of the microscope, the process of "transmitting a microscope image" is performed in S810, and the obtained microscope image is transmitted from the PC 705 to the PC 701. When the PC 701 receives the microscope image in the "microscope image receiving" process in S822, the "image linkage and observation" process is performed in S823, and the microscope image corresponding to the received data is displayed on the monitor 702. The PC 705 performs the "image linkage and observation" process in S811, and the same microscope image is displayed on the monitor 704.

If the image data obtained and transmitted at the Z sequential moving request is the moving picture coded data of the MPEG, then the PC 701 performs the MPEG data display software, and the data is displayed on the monitor 702. If the still image data is compressed by the JPEG system, etc., the image is displayed after performing the data expanding process.

Then, the PC 701 determines in S824 whether or not the "observation has terminated", that is, whether or not the operator has input the designation of the termination of the observation. If the termination designation has not been issued, then control is returned to the determining process in S818 as to whether or not the Z sequential moving request has been issued. If it is determined in S824 that the observation has terminated, then the "line disconnection requesting" process is performed in S825, and the line disconnection request is transmitted from the PC 701 to the PC 705. The PC 705 receives the line disconnection request, performs the line disconnecting process in S812, and the process terminates in S813. The PC 701 terminates the process in S826.

As described above, in the microscope remote observation system shown in FIG. 8, a plurality of microscope images obtained by sequential moving in the optical axis direction of the microscope are fetched.

Third Embodiment

Figure 10:
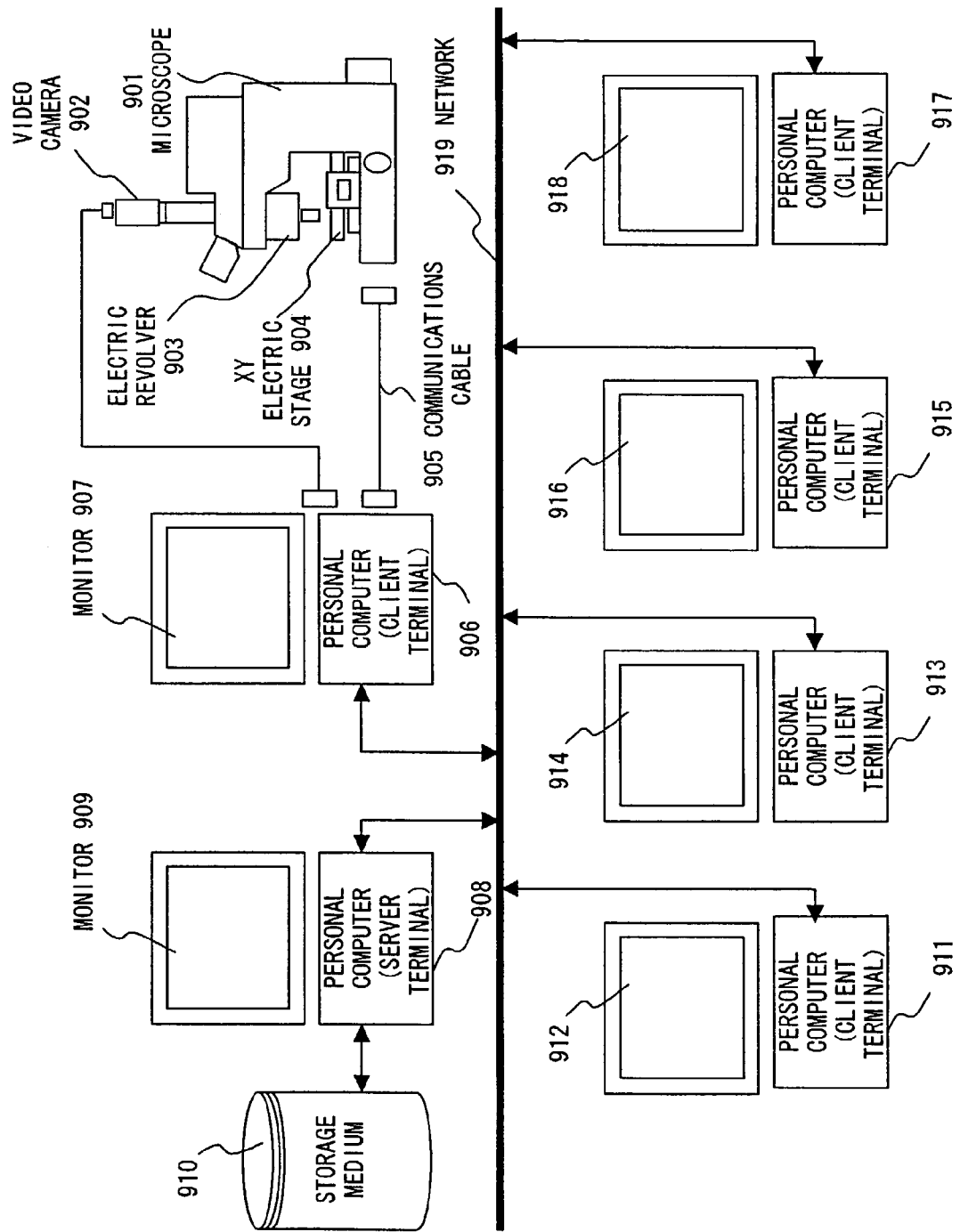
FIG. 10 shows the configuration of the system according to the third embodiment of the present invention.

FIG. 10 shows the configuration of the observation network system according to the third embodiment of the present invention.

A storage medium 910 having a large capacity is connected to a PC 908 which is a server terminal for managing a plurality of client terminals, that is, PCs (906, 911, 913, 915, and 917), and functions as an image database.

A microscope 901 is connected to one of the plurality of client PCs, for example, the PC 906. The PC 906 is provided with a video capture board and a network card (not shown in the attached drawings), and is connected to the PC 908 through a network 919 configuring a LAN. The microscope 901 connected to the PC 906 is provided with an electric revolver 903, an XY electric stage 904, electric units not shown in the attached drawings such as an autofocus unit, an electric diaphragm unit, an electric dimmer unit, etc. A unit for establishing communications between a control portion for controlling the electric units of the microscope and the PC 906 is also provided in the microscope 901, and the microscope 901 and the PC 906 are connected through a communications cable 905.

When the image of the microscope 901 is input from a video camera 902 to the capture board in the PC 906, it is converted into digital data. The microscope image data is entered in the image database of the PC 908 through the network 919, and accumulated in the storage medium 910. FIG. 10 shows the four PCs (911, 913, 915, and 917) to which the microscope is not connected. These PCs are connected to the PC 908 through a network. The configuration shown in FIG. 10 refers to an example of a network connection in a local network, but a public line, etc. can be used between the PC 908 and the PCs (906, 911, 913, 915, and 917) for connection to the PC 908 in the connecting process using a dial-up capability and so on.

With the above-mentioned configuration, the microscope image obtained by sequentially moving the position of the focal point in the optical axis direction (Z) of the microscope is entered in the image database of the PC 908 from the PC 906 to which the microscope 901 is connected through the network 919, and recorded and stored on the storage medium 910. That is, the virtual focus data of the microscope image is accumulated in the PC 908.

Thus, an image can be obtained by sequentially moving the microscope image in the optical axis direction (Z) of the microscope at an optional timing from each PC (911, 913, 915, and 917) connected through a network. Additionally, a synchronization system for displaying the same images on the plurality of PCs (911, 913, 915, and 917) by controlling the communications by designating a switch of the same screens on each PC (911, 913, 915, and 917) from the PC 908 can be configured. Furthermore, using the system, a peculiar cell diagnostics is entered in the image database of the PC 908, and the image data is displayed synchronously or asynchronously from the plurality of PCs (911, 913, 915, and 917) for use in the education field. Furthermore, if the image data is distributed through the Internet, general users can experience the microscope virtual focus data.

In each of the above-mentioned embodiments, the processes shown in the flowcharts in FIGS. 5, 7, and 8 are performed by a computer having a standard configuration, that is, comprising a CPU for controlling each component of the computer by executing a control program, ROM, RAM, a magnetic storage device, etc., and generating a program used to direct a computer comprising: a storage unit used as a work area when the control program for controlling each component by the CPU is stores or when the CPU performs the control program or a storage area of various data, an input unit for obtaining various data corresponding to the operation by the user, an output unit for notifying the user of various data by displaying it on a display, etc., and an I/F unit for providing an interface function for connection to a network. The present invention can be embodied by the computer executing the program.

Figure 11:
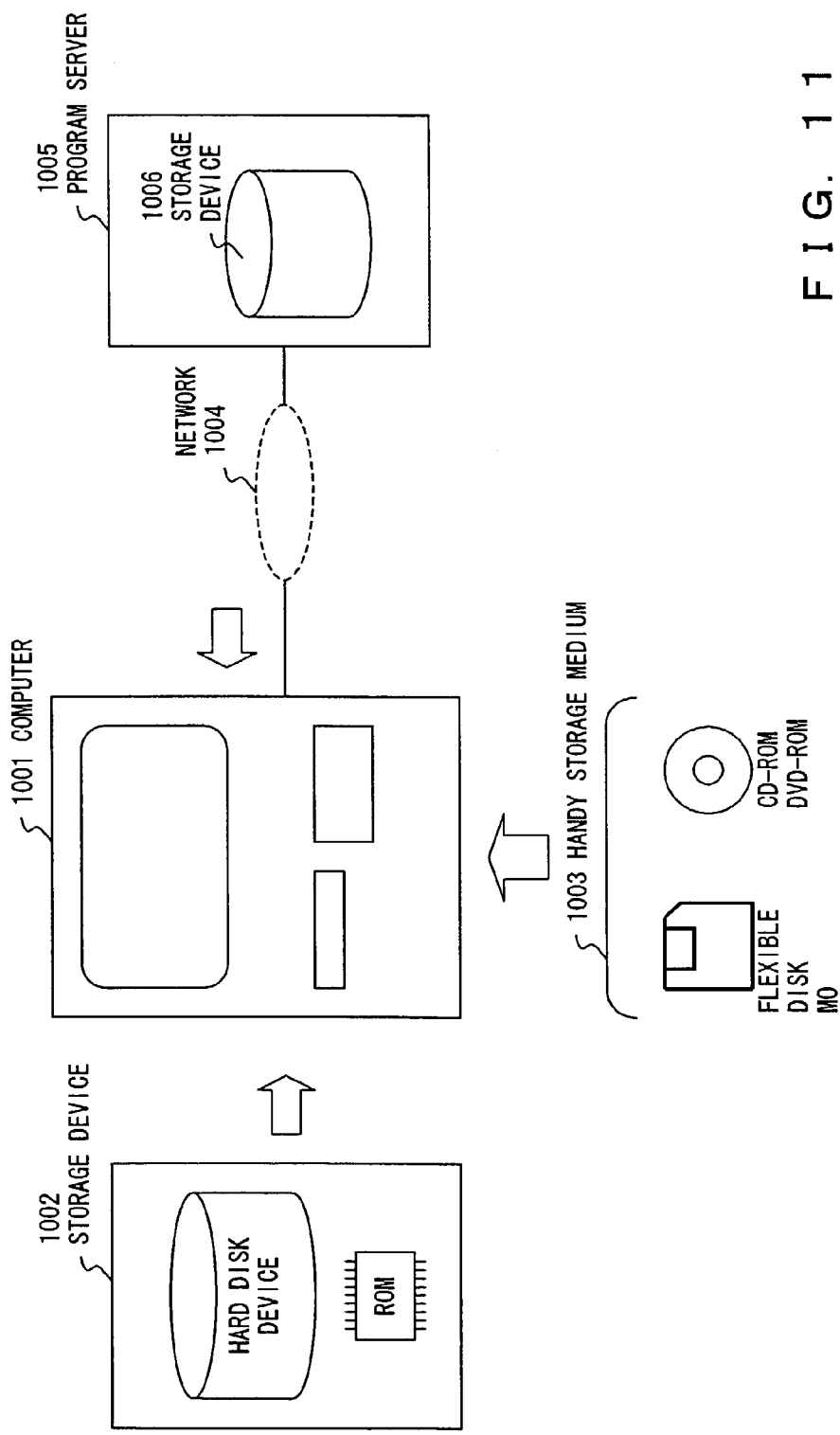
FIG. 11 shows an example of the recording medium from which a computer can read a program recorded therein.

Furthermore, the present invention can also be embodies by a computer-readable storage medium recording the above-mentioned program, and reading the program from the storage medium, and allowing the CPU to execute the program. An example of a storage medium capable of reading a recorded control program by a computer is shown in FIG. 11. For example, a storage device 1002 such as ROM, a hard disk device, etc. provided as a built in or external accessory device to a computer 1001, a handy storage medium 1003 such as a floppy disk, an MO (magneto-optical disk), CD-ROM, DVD-ROM, etc. can be used.

Furthermore, a storage medium can be a storage device 1006 built in or external to a program server 1005 connected to the computer 1001 through a communications network 1004. In this case, the program server 1005 transmits a transmission signal obtained by modulating a carrier signal by the control program recorded in the storage device 1006 of the program server 1005, the computer 1001 demodulates the control program using the transmission signal received through the communications network 1004, and the CPU executes the demodulated program.

It is obvious that the present invention is not limited to the above-mentioned embodiments, but various improvements and variations can be realized. For example, in the above-mentioned embodiments of the present invention, medical and biological observation systems are described. However, the present invention is not limited to the applications described in the embodiments. For example, it can be applied to a support system for an operator efficiently and remotely making a detailed inspection on a semiconductor pattern in the industrial field.

As described above in detail, the present invention can be usefully applied in obtaining and observing images by moving the position of the focal point using the smallest possible number of images without wasting the images of a target as a thick sample in, for example, cell diagnostics.

What is claimed is:

1. A microscope control system which obtains a microscope image of an observation target sample by controlling a microscope having at least two objective lenses, comprising:
   an objective lens information record unit recording objective lens information associating the objective lenses with numerical apertures of the objective lenses;
   an objective lens selection information obtaining unit obtaining selection information about the objective lenses selected to obtain the microscope image;
   an objective lens numerical aperture obtaining unit obtaining the numerical aperture of the selected objective lens from the objective lens information record unit according to the selection information;
   a focal point moving interval determination unit determining a moving interval per moving operation of optical-axis-direction moving of a position of a focal point of the microscope under a condition of the same objective lens based on the numerical aperture of the objective lens obtained by the objective lens numerical aperture obtaining unit and a wavelength of light for observation of the sample;
   a focal point moving range determination unit determining a range of motion where optical-axis-direction moving of the position of the focal point is based only upon an estimated value of a thickness of the sample on a slide;
   a focal point moving control unit controlling the microscope such that the focal point is moved to positions in alignment with an optical axis direction separated by a distance equal to said moving interval from a top or bottom end position toward an other end of the moving range sequentially; and
   a microscope image obtaining control unit controlling the microscope such that the microscope images are obtained respectively in correspondence to the aligning positions separated by a distance equal to the moving interval when the focal point is sequentially moved to these positions, wherein
   the focal point moving interval determination unit determines the moving interval, $\Delta Z$, according to the formula:

$$\Delta Z = \lambda/(4 \times NA^2)$$

wherein NA is the numerical aperture of said objective lens and $\lambda$ is the wavelength of light for observation of the sample.

2. The system according to claim 1, further comprising:
   a designation unit designating an optional portion of the microscope image obtained by the control of the microscope image obtaining control unit;
   a brightness information obtaining unit obtaining information about brightness of the portion; and
   a microscope image addition unit adding a plurality of microscope images obtained by the microscope when the position of the focal point relative to the sample position is the same if the brightness is smaller than a predetermined value.

3. The system according to claim 1, further comprising:
   a moving picture conversion unit converting the microscope images which are a plurality of still images obtained in the different positions of the focal point at the moving intervals by the control of the microscope image obtaining control unit into one piece of moving picture data.

4. The system according to claim 1, wherein
   the focal point moving control unit is configured to control the microscope such that a central point of the range of motion matches the position of the focal point about the sample obtained as a result of performing a autofocus setting capability of the microscope when the movement of the position of the focal point is controlled.

5. The system according to claim 1, wherein
   the focal point moving control unit is also configured to control the microscope such that an upper limit of the range of the focal point on the sample obtained as a result of executing the autofocus setting capability of the microscope matches the upper limit of the range of motion, or a lower limit of the range of the focal point on the sample obtained as a result of executing the autofocus setting capability of the microscope and matches the lower limit of the range of motion when the movement of the position of the focal point is controlled.

6. The system according to claim 2, wherein
   when the information about the brightness of each of the primary colors of light is obtained as the information about the brightness of the portion, the brightness information obtaining unit is assumed to define the highest brightness value as the information about the brightness of the portion.

7. The system according to claim 1, further comprising:
   a requesting terminal having a microscope; and
   an observing terminal designating the control of the microscope wherein:
   the requesting terminal comprises a requesting line connection unit for connecting the requesting terminal to a communications line, and transmitting image information representing the microscope image obtained by the microscope provided for the requesting terminal to the observing terminal; and
   the observing terminal includes an observing line connection unit for connecting the observing terminal to the communications line, transmitting request information about a request to start designation of control of the microscope provided for the requesting terminal to the requesting terminal, and receiving the image information transmitted by the requesting line connection unit.

8. The system according to claim 1, further comprising:
   a storage unit storing image information representing the microscope images sequentially obtained by the control of the microscope image obtaining control unit.

9. The system according to claim 8, further comprising:
   a server terminal having the storage unit; and
   a client terminal obtaining the image information stored in the storage unit, wherein the server terminal includes a server terminal line connection unit for connecting the server terminal to the communications line, and transmitting the image information stored in the storage unit to the client terminal; and the client terminal includes a client terminal line connection unit for connecting the client terminal to the communications line, transmitting a request to transmit the image information stored in the storage unit of the server terminal to the server terminal, and receiving the image information transmitted by the server terminal line connection unit.

10. A microscope control method for controlling a microscope having objective lenses to obtain microscope images of an observation target sample, comprising steps of:

recording objective lens information associating the objective lenses with numerical apertures of the objective lenses;

obtaining selection information about the objective lens selected to obtain the microscope image;

obtaining the numerical aperture of the selected objective lens from a record of the objective lens information according to the selection information;

determining a moving interval per moving operation of optical-axis-direction moving of a position of a focal point of the microscope under a condition of the same objective lens based on the obtained numerical aperture of the objective lens and a wavelength of light for observation of the sample, determining a range of motion where optical-axis-direction moving of the position of the focal point is based only upon an estimated value of a thickness of the sample on a slide;

controlling the microscope such that the focal point is moved to positions aligning in an optical axis direction separated by a distance equal to said moving interval from the top or bottom end position toward the other end of the moving range sequentially; and controlling the microscope such that the microscope images are obtained respectively in correspondence to the aligning positions separated by a distance equal to the sequential moving interval when the focal point is moved to these positions, wherein said moving interval, $\Delta Z$, is determined according to the formula:

$$\Delta Z = \lambda/(4 \times NA^2)$$

wherein NA is the numerical aperture of said objective lens and $\lambda$ is the wavelength of light for observation of the sample.

11. The control method according to claim 10, wherein said microscope is provided for a requesting side terminal and operation of said microscope is controlled accordingly to an instruction issued from an observing side terminal, and the control method further comprises steps of:

the observing side terminal transmitting request information indicating a request for starting to transmit an instruction for controlling operation of the microscope to the requesting side terminal;

the requesting side terminal transmitting image information representing the microscope images obtained by the microscope to the observing side terminal; and the observing side terminal receiving the image information transmitted from the requesting side terminal.

12. The control method according to claim 10, further comprising a step of:

storing image information representing the microscope images obtained sequentially.

* * * * *